United States Patent [19]

Wiquel

[11] 4,076,014
[45] Feb. 28, 1978

[54] SOLAR CIGARETTE LIGHTER

[76] Inventor: Attilio-William Wiquel, c/o Monaco Government Tourist Office, 115 E. 64th St., New York, N.Y. 10021

[21] Appl. No.: 713,797

[22] Filed: Aug. 12, 1976

[51] Int. Cl.² ............................................. F24J 3/02
[52] U.S. Cl. .................................. 126/270; 350/294
[58] Field of Search ................. 126/270, 271; 350/294

[56] References Cited

U.S. PATENT DOCUMENTS

| 1,442,696 | 1/1923 | Nutt ................................... 126/270 |
| 3,817,605 | 6/1974 | Franklin et al. ..................... 126/270 |

FOREIGN PATENT DOCUMENTS

| 236,083 | 5/1959 | Australia ............................. 126/270 |
| 238,019 | 3/1959 | Australia ............................. 126/270 |
| 1,460,899 | 12/1966 | France ................................. 126/270 |

Primary Examiner—Kenneth W. Sprague
Assistant Examiner—James C. Yeung

[57] ABSTRACT

A solar cigarette lighter comprises a hollow tube having over at least part of its length from one end a free inside diameter adapted to receive a cigarette, an inwardly projecting ring between the ends of the tube to limit motion of a cigarette through the tube, and a lens of positive power affixed at the other end of the tube, distant by substantially its own focal length from the ring, whereby upon aiming the tube toward the sun with the end of the tube containing the lens toward the sun, the sun's rays falling on the lens will be brought to focus on the end of a cigarette introduced into the tube from said one end as far as the ring, and the cigarette will be lighted.

4 Claims, 4 Drawing Figures

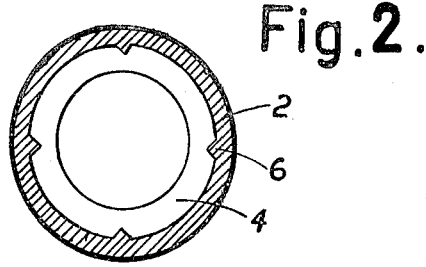
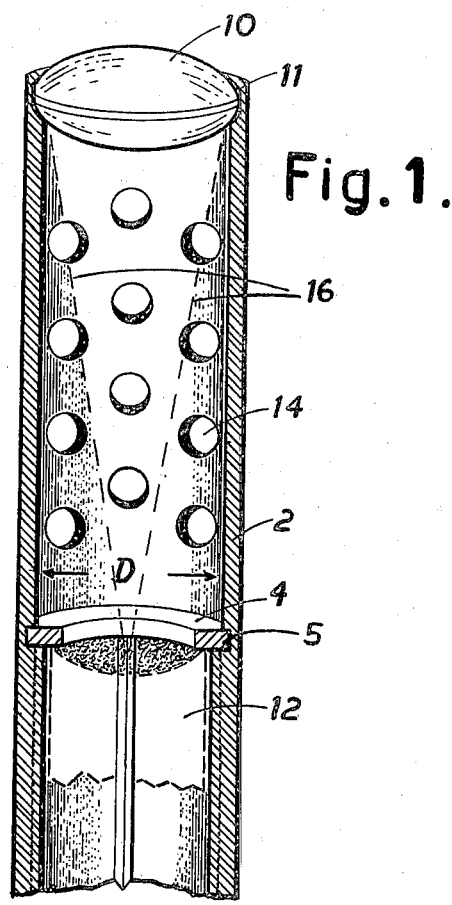
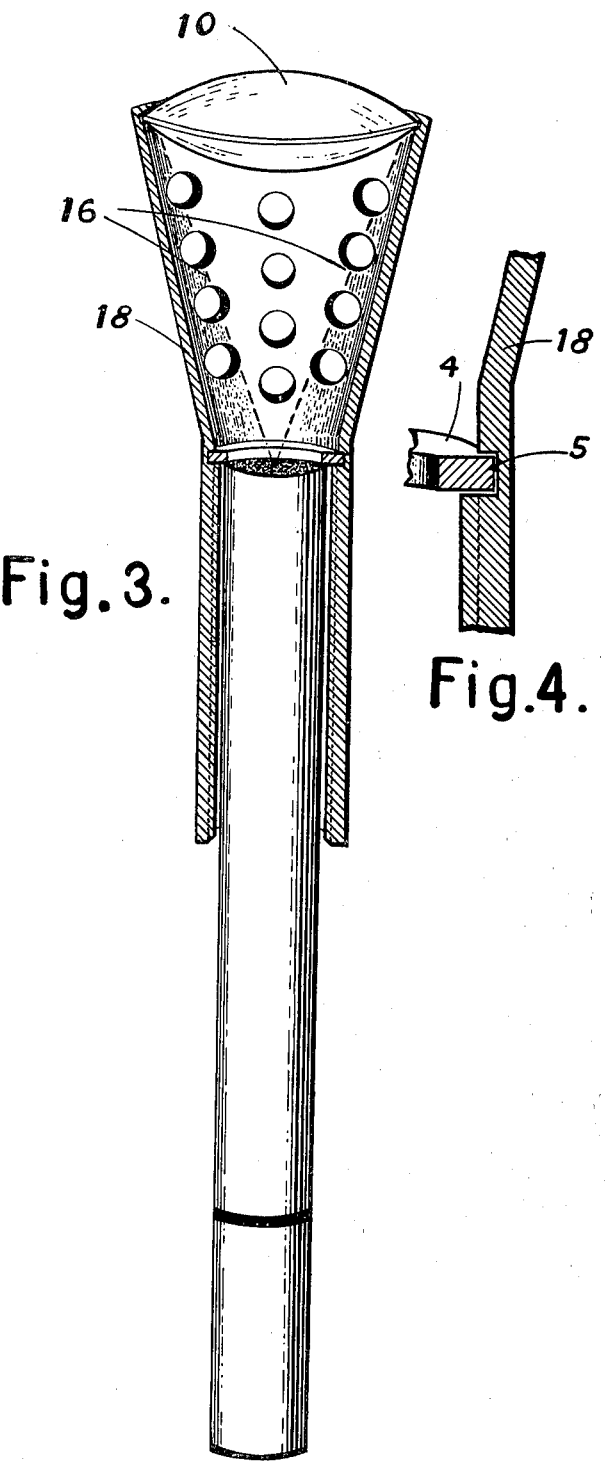
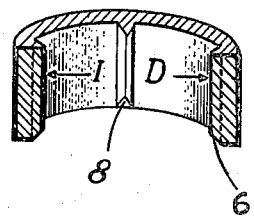

SOLAR CIGARETTE LIGHTER

The present invention relates to cigarette lighters, and more particularly to a cigarette lighter operating by means of solar energy. The invention provides a lighter by means of which a cigarette may be conveniently lighted by means of heat from the sun's rays, without resort to match or flint or fuel, liquid or gaseous. The aroma of the tobacco, and hence the smoke of the cigarette, are therefore not contaminated by any such fuel, and not even by the chemical constituents of a match. The lighter of the invention has the additional advantage of being immune to the wind (being in particular useful out of doors, for example on the beach, in camping or boating, although not limited to such use), and it reduces the risk of forest or other firs from an open flame.

BRIEF DESCRIPTION OF THE DRAWING

The invention will now be further described in terms of two presently preferred exemplary embodiments thereof and by reference to the accompanying drawing wherein:

FIG. 1 is substantially a longitudinal axial sectional view of a lighter in accordance with the invention, with a fragmentary phantom showing of a cigarette in process of being lighted;

FIG. 2 is an end view of the lighter of FIG. 1, looking from beneath in FIG. 1;

FIG. 3 is substantially a longitudinal axial sectional view of another lighter in accordance with the invention, shown at a different scale than the lighter of FIG. 1 and shown with a cigarette in process of being lighted; and FIG. 4 is a fragmentary view at an enlarged scale of a portion of the lighter of FIG. 3.

DESCRIPTION OF THE PREFERRED EMBODIMENTS

Referring first to FIGS. 1 and 2, the lighter of the invention there shown comprises a tube 2, conveniently made of plastic material by an injection molding process. The tube may however be made of any other suitable material, including metal, and by any suitable process whatever the material thereof.

Over at least a portion of its length extending from one end thereof, the tube 2 possesses a free inside diameter, indicated at I.D. in FIG. 1, suitable to accept with easy clearance but without excessive clearance a cigarette of normal and customary diameter, whatever its length. In the embodiment illustrated in FIGS. 1 and 2, this portion, shown broken for convenience, extends from the lower end of the tube (as seen in FIG. 1) to a ring 4 to be described presently. This free inside diameter is defined, in that embodiment, by a plurality (desirably four or more) inwardly extending ridges or ribs 6. These ribs may be bevelled at their lower end, as indicated at 8, to facilitate insertion of the cigarette to be lighted.

The ribs 6 serve to center the cigarette properly, and permit readily giving to the tube, especially on the side of the ring 4 away from the ribs (i.e. on the upper side of the ring, in FIG.1) an inside diameter D larger than the diameter of the cigarette to be lighted.

At the other end of the tube, remote from the ribbed cigarette-receiving portion, there is affixed a lens 10 of positive power, conveniently although not necessarily of biconvex shape. The lens may be made of glass or of a transparent plastic material; it need not be of high optical quality. The lens may be affixed to the tube by being received by detent action in an annular groove 11 in the inner surface of the tube. The diameter of the lens exposed to light is accordingly, and advantageously, the full inside diameter D of the tube, larger than the diameter of the cigarette to be lighted. The lens may thus have a convenient large light gathering surface, so as to be able to ignite the cigarette quickly.

Intermediate the ends of the tube there is provided a constriction or partial obstruction, which in the embodiment illustrated takes the form of a ring 4, received by detent action in a circular groove 5 in the inside surface of the tube. The ring has an inside diameter smaller than the diameter of a cigarette, indicated in phantom at 12, so that a cigarette introduced into the free end of the tube, i.e. the end opposite to the lens 10, cannot proceed past the ring 4.

The tube 2 is provided with apertures 14 in the portion therof between the lens 10 and the ring 4 through which the smoke of the ignited cigarette can escape as a sign that the cigarette has been lighted. As soon as such smoke appears the user removes the cigarette from the lighter and draws thereon at his mouth.

As indicated in FIG. 1 by the dashed lines 26, the lens 10 brings to a focus, substantially in the plane of the remote side of the ring 4, light from a distance source such as the sun. Otherwise stated, the distance from the lens 10 to the face of the ring 4 remote from the lens is substantially equal to the focal length of the lens.

Thus with a cigarette inserted to bring its end against the ring 4, as indicated at 12 in FIG. 1, and with the lighter held with the lens 10 toward the sun and with the length of the tube 2 parallel to the sun'rays, the sunlight falling on the lens will be brought to a focus on the end of the cigarette, quickly igniting it.

FIGS. 3 and 4 illustrate another embodiment of the invention, in which the tube includes a conical portion 18 between the ring 4 and the lens, identified at 10', so that that lens may be of larger diameter and greater light gathering power. FIG. 4 illustrates how, in this embodiment as in that of FIGS. 1 and 2, the ring 4 is received in an annular groove 5 in the inside surface of the tube.

While the invention has been described hereinabove in terms of two presently preferred embodiments thereof, the invention is not limited thereto, but rather comprehends all modifications of and departures from those embodiments falling within the scope of the appended claims. Thus for example other arrangements may be employed to hold the lens in proper position, coaxial with the cigarette-supporting tube and at its own focal distance from the position defined for the end of the cigarette by the constriction in the tube. The lens may be supported from the tube by struts, to mention only one possibility.

I claim:

1. A cigarette lighter comprising a hollow tube, apertured means intermediate the ends of the tube to prevent a cigarette introduced into the tube at one end thereof from passing through the tube beyond said means, a lens of positive power arranged on the tube on the side of said means remote from said one end and spaced substantially by its own focal length from said means, and a plurality of axially extending ribs projecting inwardly from the inside wall of the tube in the portion thereof between said means and said one end of the tube, to center and guide a cigarette.

2. A cigarette lighter according to claim 1 wherein said lens is mounted coaxially of said tube.

3. A cigarette lighter according to claim 2 wherein said tube is of circularly cylindrical shape.

4. A lighter according to claim 1 wherein said means comprise a ring having an inside diameter smaller than the diameter of a cigarette of normal thickness.

* * * * *